Aug. 17, 1965

S. HARDING 3,200,981

BOTTLE CAPS

Filed Oct. 1, 1962

INVENTOR:
Sune Hårding
by E. M. Squire
ATTORNEY

United States Patent Office 3,200,981
Patented Aug. 17, 1965

3,200,981
BOTTLE CAPS
Sune Hårding, Bromma, Sweden, assignor to Aktiebolaget Wicanders Korkfabriker, a Swedish joint-stock company
Filed Oct. 1, 1962, Ser. No. 227,404
Claims priority, application Sweden, Oct. 3, 1961, 9,817/61
4 Claims. (Cl. 215—41)

The present invention relates to a one-piece integrally molded bottle cap having a conically divergent central sealing portion which defines a completely enclosed annular space between the sealing portion and the end wall of the cap. This annular space makes the sealing portion particularly adaptable to dimensional variations in the mouths of different bottles to which the cap may be applied.

The problem has been to construct, for bottles of glass, a cap of a material having sufficiently good mechanical properties as regards shape permanence under the rather difficult load conditions to which an applied cap, for example, is subjected, and at the same time the construction must be such that the sealing pressure between the mouth rim (sealing surface) of the glass bottle and the sealing part of the cap becomes so great that the cap material in the sealing point closely fits itself to the glass mouth and also is pressed into the small surface irregularities which normally occur in bottle mouths. Furthermore, the construction must be such that it covers the measure variations which occur in the mouths of glass bottles which in many cases lie between 5 and 10%.

A material which shall be fit for the manufacture of such caps with built in sealing element, must also satisfy great demands upon chemical resistance, cleanness, freeness from releasable substances. The material must retain its good mechanical properties over great temperature intervals (preferably over the range 0–120° C.) and should have such a coefficient of friction with respect to glass that an applied cap does not get loose by itself.

Constructions hitherto tested have in the first place been directed to rather soft materials such as polyethylene of different density.

Certain definite drawbacks have thereby appeared. It has been difficult to find a construction which, without the material being overloaded, gives a good and safe closure under the varying conditions to which bottle caps are subjected.

It has then been endeavoured to try to use mechanically stronger materials, such as polypropylene, which in many respects seems to be very suitable for the purpose. It has high strength, good resistance against so-called "stress cracking," temperature resistance, good friction with respect to glass, high chemical resistance and density against diffusion, is physiologically irreproachable, easily treatable and relatively cheap.

Tests have been made e.g. with an annular spring formed in the bottom of the cap, said spring tapering towards the center or outwards towards the periphery, and which, at the application of the cap, is pressed against the mouth rim of the bottle.

Yet, these caps have not been quite satisfactory as regards density, because it has not been possible to secure a sufficient pressing of the spring against the more or less plane mouth rim at the application.

Tests have furthermore been made with a central sealing part shaped cylindrically in various ways, said sealing part being pressed down into the bottle mouth in order to seal against its inner side. It has here been difficult to cover the variations in the inner diameters of the mouths due to practical difficulties in shaping the cylindrical sealing part so that it gets sufficient possibility of fitting itself to varying diameters.

This invention relates to a form of molded one-piece cap construction which has for its object to eliminate the abovementioned drawbacks. It is based on the principle that a conically divergent sealing part is, under wedging action, pressed into the bottle mouth, a high sealing pressure being obtained even with a moderate force of application of the cap, e.g. by means of a threaded connection.

More specifically, the invention relates to a cap with a central sealing part of circular cross section extending away from the end wall of the cap and conically shaped for sealing against the bottle mouth, said part originally immediately after molding having the shape of a collar or sleeve the inside of which later forms the sealing surface. The cap according to the invention is characterized in that the sleeve, before completion of manufacture and prior to the cap being applied to the container, is bent backwards, i.e., bent to provide a double wall thickness all round along a circular line, so that the sealing part forms a hollow frustum of a cone diverging toward and engaging the end wall of the cap.

The invention will be described hereinafter with reference to the accompanying drawing which shows the invention, in a number of axial sections, as applied to some types of caps.

FIG. 1 shows a screw cap produced preferably by injection moulding.

Figure 1:
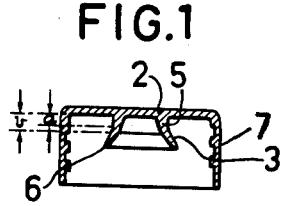
FIG. 1 shows a screw cap (after the first manufacturing stage).
Figure 2:
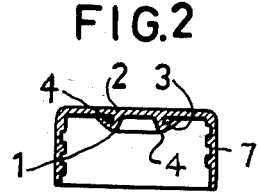
FIG. 2 shows the cap of FIG. 1 completed and ready for application to the container for which it is intended.

The sealing portion 1, as shown in FIG. 2, originally consists of a collar-like member as shown in FIG. 1. Its cylindrical base portion 5 is integrally formed with the transverse end wall 2 of the cap and is relatively thick-walled to provide sufficient stiffness. Its thickness diminishes in the direction away from the end wall 2 of the cap and merges into a conically divergent terminal extension portion 3 with a lesser wall thickness.

After the cap has been removed from the moulding tool the free terminal edge 6 of the thin-walled extension portion is bent backwards in a further manufacturing operation by means of a plunger of suitable shape, causing the extension portion to be folded back, as shown in FIG. 2 to define a completely enclosed annular space 4 between the end wall 2 and the sealing portion 1. The extension portion 3 is relatively thin in the section in order to have a certain flexibility, and, as shown in FIG. 2, it is longer than the base portion 1 whereby its free edge 6 presses against the end wall 2 of the cap and is obliquely inclined in relation to the inner base portion 5. During the folding operation, the material is considerably stretched especially in the region of the terminal edge 6. In order to enable this stretching without the material bursting or becoming too thin, there must be a sufficient material thickness initially at the folding region. This means that the height $b$ in FIG. 1 should be higher than $a$ to provide sufficient thickness. Furthermore it is required that the material used has such a stretchability that a permanent folding is possible. Polypropylene, for example, has such a property. At room temperature it can be stretched up to 100% without bursting and, at elevated temperature, up to several hundred percent.

At the same time the material, if not loaded above the yield point, has a good resilient capacity which advantageously influences the sealing in the conical collar part.

Figure 3:
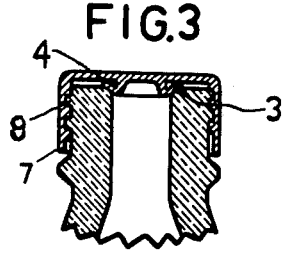
FIG. 3 shows the cap of FIG. 2 applied to a bottle.

When applying the cap to a bottle mouth, the base portion 5 of the collar is pushed into the mouth opening 7 and the outer conical extension portion 3 is pressed against the inner mouth rim and effects sealing. This action is produced by turning the skirt portion 7 of the cap which is in threaded engagement with the exteriorly threaded outer lateral surface 8 of the mouth of the bottle. FIG. 3 shows in section a bottle mouth with screwed-on cap. The outer diameter of the base portion 5 must be so dimensioned, that it corresponds to the smallest opening diameter of the bottle mouth so that, when sealing pressure is applied, the outer thinwalled extension portion 3 will be accommodated. The conical extension portion 3 is then able to cover rather large dimensional variations in the inner diameter of the mouth. This is assisted by the annular space 4. A cone angle of 45° is suitable for practical use, the angle of divergence may be greater or smaller according to the shape and dimensional tolerances of the bottle mouth. The height of the sealing portion 1 above the end wall 2 of the cap is adjusted to the aspect and size of the actual mouth. The greater this height is, the greater is the range of variations in the mouth diameter which may be covered. The dimensional tolerances occurring on a certain mouth will therefore determine the height of the sealing portion 1. At a cone angle of 45° there is, at 2 mm. collar height, obtained a frustum of a cone the greatest diameter of which is 4 mm. greater than its smallest diameter and which thus has a rather large dimensional range. For mouth openings with diameters in the range of 10 to 20 mm., it is usually the question of 0.5 to 1.5 mm. variation of the diameters, and therefore a height of 2 mm. for the sealing portion 1 is suitable.

The folding of the outer collar part could possibly be made at the time of the first application of the cap to the bottle by pressing the lower edge (6 in FIG. 1) of the collar outwardly upwardly by the edge of the bottle mouth. Yet, this has proved unsuitable in practice. It presupposes inter alia a rather long threaded axial displacement in screw caps which instead should be as short as possible in order not to be time-consuming. Furthermore, it is required that the initial diameter of the open cone at 6 must be sufficiently greater than the inner diameter of the mouth of the bottle so that a folding outwards is sure to take place. As at the same time the external diameter of the base portion 5 in FIG. 1 must be less than the smallest actual inner diameter of the bottle mouth, this is impossible technically from the viewpoint of manufacture.

Figure 4:
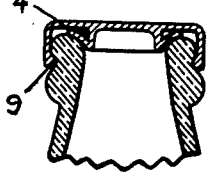
FIG. 4 shows a modified form of the cap designed to be secured to a bottle by means of a peripheral snap bead.

Besides for screw caps, the principle is applicable also to other caps, e.g., to types retained at the bottle mouth by an annular bead 9 as shown in FIG. 4.

What I claim is:

1. An integrally molded plastic cap of generally cylindrical shape comprising: a skirt portion adapted for engagement with the external lateral surface of the mouth of a bottle for securing said cap to said bottle; a transversely extending end wall portion formed integrally with said skirt portion; and a central circular sealing portion, said sealing portion comprising a hollow generally cylindrical base portion formed integrally with said end wall portion concentrically with said cap, said base portion extending away from said end wall portion in the same direction as said skirt portion for engagement with said mouth of said bottle, said sealing portion further comprising a conically divergent integrally formed terminal extension portion of said base portion, said extension portion having originally been outwardly divregent away from said end wall portion immediately after molding, said extension portion being turned to be outwardly conically divergent toward said end wall portion with its periphery under internal tension which presses the terminal edge of said extension portion into sealing engagement with said end wall portion to define a completely enclosed annular space between said end wall portion and said sealing portion with said cap removed from said bottle.

2. A cap according to claim 1, wherein said base portion is relatively thick-walled and in which said extension portion tapers convergently away from said base portion toward said terminal edge of said extension portion.

3. A cap according to claim 1, wherein said extension portion diverges conically toward said end wall portion with an angle of divergence of the order of 45 degrees.

4. The method of forming a one-piece plastic cap of generally cylindrical shape comprising a skirt portion adapted for engagement with the external lateral surface of the mouth of a bottle for securing said cap to said bottle, a transverse end wall portion formed integrally with said skirt portion, and a central circular sealing portion, said sealing portion comprising a hollow generally cylindrical base portion formed integrally with said end wall portion concentrically with said cap, said base portion extending away from said end wall portion in the same direction as said skirt portion for engagement with said sealing portion further comprising a conically divergent integrally formed terminal extension portion of said base portion, said method comprising the steps of: injection molding said cap with said extension portion diverging outwardly away from said end wall portion, said deforming said extension portion to become outwardly conically divergent toward said end wall portion with its periphery under internal tension which presses the terminal edge of said extension portion into engagement with said end wall portion to define a completely enclosed annular space between said end wall portion and said sealing portion.

References Cited by the Examiner

UNITED STATES PATENTS 3,055,526   9/62   Plunkett _____ 215—41

FOREIGN PATENTS 1,107,541   5/61   Germany.
788,148   12/57   Great Britain.

FRANKLIN T. GARRETT, *Primary Examiner.*

EARLE J. DRUMMOND, *Examiner.*